(12) United States Patent
Schwarz et al.

(10) Patent No.: US 7,818,107 B2
(45) Date of Patent: Oct. 19, 2010

(54) METHOD AND DEVICE FOR CONTROLLING THE DRIVING DYNAMICS OF A VEHICLE

(75) Inventors: Ralf Schwarz, Ingolstadt (DE); Stefan Fritz, Erzhausen (DE); Urs Bauer, Ludwigsburg (DE); Markus Weinreuter, Gross-Zimmern (DE); Matthias Muntu, Frankfurt am Main (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 795 days.

(21) Appl. No.: 10/578,986

(22) PCT Filed: Nov. 15, 2004

(86) PCT No.: PCT/EP2004/052960
§ 371 (c)(1),
(2), (4) Date: Mar. 16, 2007

(87) PCT Pub. No.: WO2005/047086
PCT Pub. Date: May 26, 2005

(65) Prior Publication Data
US 2007/0288146 A1  Dec. 13, 2007

(30) Foreign Application Priority Data
Nov. 14, 2003 (DE) ................. 103 53 550
May 18, 2004 (DE) ............ 10 2004 024 545

(51) Int. Cl.
*B62D 6/00* (2006.01)
(52) U.S. Cl. .......................... 701/41; 701/44
(58) Field of Classification Search ............ 701/40, 701/41, 42, 44
See application file for complete search history.

(56) References Cited

U.S. PATENT DOCUMENTS

| 5,172,785 | A |   | 12/1992 | Hiroshi et al. |
|---|---|---|---|---|
| 5,386,365 | A | * | 1/1995 | Nagaoka ................. 701/44 |
| 5,508,919 | A |   | 4/1996 | Hidekazu et al. |
| 5,519,614 | A | * | 5/1996 | Miichi et al. ............ 701/44 |
| 5,561,603 | A |   | 10/1996 | Takeshi et al. |
| 5,566,072 | A | * | 10/1996 | Momose et al. ......... 701/117 |
| 5,634,698 | A | * | 6/1997 | Cao et al. ............... 303/146 |
| 6,170,600 | B1 | * | 1/2001 | Shimizu ................. 180/446 |
| 6,175,792 | B1 | * | 1/2001 | Jones et al. .............. 701/37 |
| 2003/0135290 | A1 | * | 7/2003 | Yao et al. ............... 700/50 |
| 2004/0030479 | A1 | * | 2/2004 | Arndt et al. ............. 701/70 |
| 2004/0064229 | A1 |   | 4/2004 | Stout et al. |
| 2004/0088093 | A1 | * | 5/2004 | Yao et al. ............... 701/44 |
| 2004/0138797 | A1 | * | 7/2004 | Yao et al. ............... 701/44 |
| 2005/0043874 | A1 | * | 2/2005 | Chen et al. .............. 701/42 |

(Continued)

FOREIGN PATENT DOCUMENTS

WO    1992/5994    4/1992

*Primary Examiner*—Khoi Tran
*Assistant Examiner*—Brian J Broadhead

(57) ABSTRACT

A method for controlling the driving dynamics of a vehicle provides that a steering movement is carried out on the basis of a set value, which is calculated as a function of a deviation between a desired value and an acquired actual value of a vehicle state variable.

In this method, at least one membership degree of an acquired value of a steering angle, which is set by a driver, and/or of a steering angle gradient, which is set by the driver, in a predetermined fuzzy set, are/is determined, and a value of the set value is changed as a function of the membership degree.

7 Claims, 4 Drawing Sheets

U.S. PATENT DOCUMENTS

2005/0065697 A1* 3/2005 Niino et al. .................... 701/71
2005/0159851 A1* 7/2005 Engstrom et al. ............... 701/1
2005/0256622 A1 11/2005 Futterer et al.
2006/0265108 A1* 11/2006 Kieren et al. ................... 701/1
2007/0288146 A1* 12/2007 Schwarz et al. ............... 701/44

* cited by examiner

METHOD AND DEVICE FOR CONTROLLING THE DRIVING DYNAMICS OF A VEHICLE

BACKGROUND OF THE INVENTION

The present invention relates to a method for controlling the driving dynamics of a vehicle, in which the steering movement is carried out as a function of a set value, which is calculated as a function of a deviation between a desired value and an actual value of a vehicle state variable.

The invention also relates to a device for controlling the driving dynamics of a vehicle with a controlling unit, which, based on the deviation of an acquired actual value of a vehicle state variable from a predetermined desired value, determines a set value, on the basis of which a steering movement is carried out.

ESP systems, which are used in cars to carry out an electronic stability program (ESP) according to the state of the art intervene for the purpose of stabilizing the vehicle in a brake system and in a combustion motor management. As a result of the interventions, yaw moments are generated in the process, which act against oversteering or understeering of the vehicle and against interfering moments which cause interfering yaw movements of the vehicle.

A block diagram of such an ESP system is shown in FIG. 1. Based on a steering angle $\delta_{Drv}$, which is set by the driver 110 of the vehicle 150, a computer unit 120 in the process, on the basis of a vehicle reference model, determines a reference value $\dot{\psi}_M$ for the yaw rate of the vehicle 150. This reference value $\dot{\psi}_M$ is compared by a control unit 130 with an actual value $\dot{\psi}$ of the yaw rate, which is acquired by the yaw rate sensor. If the difference between the actual value $\dot{\psi}$ and the reference value $\dot{\psi}_M$ exceeds a given threshold value, then, as a function of the deviation from the rule, a set $P_{WhlRef}$ of wheel-specific brake pressures and a motor moment $u_{Mot}$ are determined, and transmitted by another unit 140 as setting signals to the brake system and the combustion motor management of the vehicle 150.

In the control intervention, the current driving situation is also taken into account, which is calculated based on additional data. These data comprise, for example, the brake pressure $P_{Drv}$, which is set by the driver, the set $\Omega_{Whl}$ of the different wheel velocities, the vehicle acceleration $a_y$, and, optionally, the set $P_{Whl}$ of the wheel-specific brake pressures, and they allow, for example, the calculation of the vehicle velocity.

However, the brake intervention, which is carried out particularly by the ESP system, can be sensed clearly by the driver as a vehicle deceleration, and therefore, for reasons pertaining to comfort, it can be used only in the area which is critical for the driving dynamics. In the less than critical handling range, setting interventions based on the braking are acceptable only conditionally.

The motor interventions that are carried out are associated with interfering variations of the steering force, and, in addition, because their dynamics are limited as a matter of principle, they do not offer any potential at all for effectively supporting the driver in the handling range.

It has already been proposed to carry out a yaw rate control based on interventions in the steering system of a vehicle and by means of additional steering movements, which are superposed over the steering movement of the driver, to generate a yaw moment which acts against the oversteering or understeering and compensates for interfering moments.

A yaw rate control, which is based on steering interventions, here has the potential of assisting the driver, even in less than critical driving maneuvers, and thus to improve the handling as well as the agility of the vehicle.

However, the prerequisite is that the additional steering movement of the vehicle's driver is not perceived as an interference.

Therefore, the invention is based on the problem of adjusting steering interventions, which are carried out during the control of the driving dynamics, as harmonically as possible to the steering movements of the driver.

SUMMARY OF THE INVENTION

According to the invention, this problem is solved by a method for controlling the driving dynamics of a vehicle, in which a steering movement is carried out on the basis of a set value, which is carried out as a function of a deviation between a desired value and an acquired actual value of a driving state variable, in such a manner that at least one membership degree of an acquired value of a steering angle, which has been set by the driver, and/or of a steering angle gradient, which has been set by the driver, in a given fuzzy set is determined, and a value of the set value is changed as a function of the membership degree.

The set value is preferably a steering angle, which is set by means of a so-called superposition steering additionally to the steering angle, which is set by the driver, on a steerable wheel of the vehicle.

The invention makes it possible to take into consideration the steering instructions of the driver during the generation of the additional steering movement, and to design the steering interventions for controlling the driving dynamics so they are more comfortable for the driver. As a result it becomes possible to be able to perform control interventions even in less than critical driving situations, and thus to increase the agility of the vehicle.

The set value is preferably a steering angle, which is set by means of a so-called superposition steering additionally to the steering angle, which is set by the driver, on a steerable wheel of the vehicle.

Control interventions for improving the agility of a vehicle are appropriate and advantageous here both in view of the driver's driving pleasure and also in view of the driving safety.

In the case of steering instructions with high steering angle gradients the vehicle reacts with some delay particularly because of the elastic undercarriage elements as well as the vehicle's inertia. The driver perceives this as an indirect reaction behavior and as a loss of driving pleasure. In the case of avoidance maneuvers, one also frequently observes that a driver, because of the delay in the vehicle's reactive behavior, chooses excessively large steering angles, so that the delayed vehicle reaction in the end is more vigorous than the driver expects, and the vehicle can become unstable.

Advantageously, using the method according to the invention, one can now carry out autonomous steering interventions to improve the agility and the reactive behavior of a vehicle, and to harmonically adapt to the behavior of the driver.

A special advantage of the invention here consists in that the steering movements of the driver can be classified, as a function of his/her subjective perception, as "strong" or "weak" steering movements with "small" or "large" steering angles and steering angle gradients.

This classification is achieved by describing the linguistic values "small" and "large" with fuzzy sets. The membership of a value, for example, a measured value of a steering angle sensor to a fuzzy set is represented here by the membership degree of the value in this set, which is a function value of a so-called membership function and assumes values belonging to the interval [0,1].

In the context of extensive driving tests, it has been shown that additional steering interventions using additional steering angles of large value are not tolerated by the driver, when he is not intervening at all or only slightly via the steering wheel in the steering event. On the other hand, full driving-dynamic support by a driving dynamic controller must occur in driving situations where the driver contributes a considerable effort to the driving.

In a highly preferred embodiment of the method according to the invention, these observations are taken into account by the fact that the set value is changed on the basis of a fuzzy rule, according to which the value of the set value is decreased when the amount of the steering angle which is set by the driver and the amount of the steering angle gradient which is set by the driver are "small."

In this embodiment it is therefore advantageous to determine the membership degrees of the acquired values of the steering angle, which is set by the driver, and of the steering angle gradient, which is set by the driver, in a set of "small" steering angles and "small" steering angle gradients, respectively. This procedure is carried out advantageously using appropriate left-bounded membership functions, where the assigned value is zero for the steering angle, and the membership degree one is assigned to the steering angle gradient, respectively.

The conclusion of the fuzzy rule is advantageously reached by multiplying the value of the set value with a factor, which is formed appropriately from the membership degrees, so that no defuzzification of the set value has to be carried out.

A particularly good adaptation of the additional steering movement to the steering behavior of the driver is also achieved if, even at low values of the steering angle gradient, which has been set by her, an additional steering movement is carried out, but not in the case of small steering angles.

Therefore, it is advantageously provided that the set of "small" steering angles presents no tolerance in contrast to the set of "small" steering angle gradients.

Another preferred embodiment of the method according to the invention is characterized in that, in addition to the adaptation of the steering interventions to the steering behavior of the driver, an adaptation to the vehicle velocity is carried out.

It was observed that steering dynamic interventions on the steering remain nearly without effect at very "low" velocities, and can therefore be omitted. At very "high" velocities, "small" steering movements are appropriate, to avoid causing instabilities of the vehicle.

In another preferred embodiment of the method according to the invention, the value of the set value is therefore changed as a function of an acquired value of a vehicle velocity.

It is advantageous here for the value of the set value to be changed particularly as a function of the membership degree of the acquired value of the vehicle velocity in a set of "mean" velocities.

By an appropriate selection of the membership function of the set of "mean" velocities, one can here advantageously achieve the effect that the additional steering movement is completely suppressed, when the acquired value of the vehicle velocity is below a first limit value and above a second limit value.

Besides the described method, the invention also produces an advantageous device for carrying out the method.

The device for controlling the driving dynamics of a vehicle with a control unit, which, based on the deviation of an acquired actual value of a vehicle state variable from a given desired value, determines a set value, on the basis of which a steering movement is carried out, is characterized particularly in that it contains a fuzzy logic unit for determining the membership degree of a value of the steering angle, which has been set by the driver, with respect to of "small" steering angles and the membership degree of a steering angle gradient, which has been set by the driver, with respect to of "small" steering angle gradients, and for changing a value of the set value by linking the membership degrees.

In a preferred embodiment, the device also comprises a logic unit for determining the membership degree of an acquired value of the vehicle velocity with respect to of "mean" velocities and for changing the value of the set value as a function of this membership degree.

Additional advantages and advantageous variants of the invention can be obtained from the following description of preferred embodiment examples with reference to the figures.

DETAILED DESCRIPTION OF THE DRAWINGS

Figure 1:
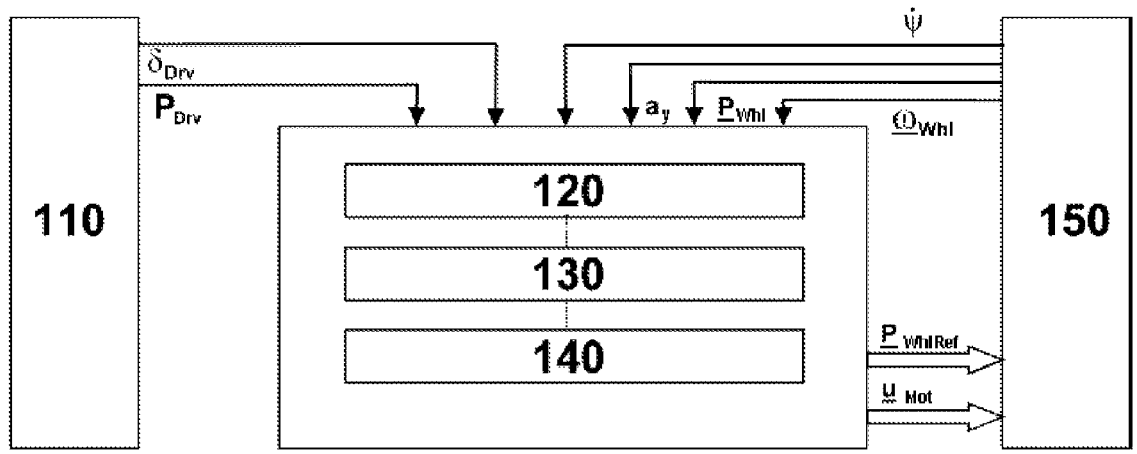
FIG. 1 shows a block diagram of an ESP system according to the state of the art.
Figure 2:
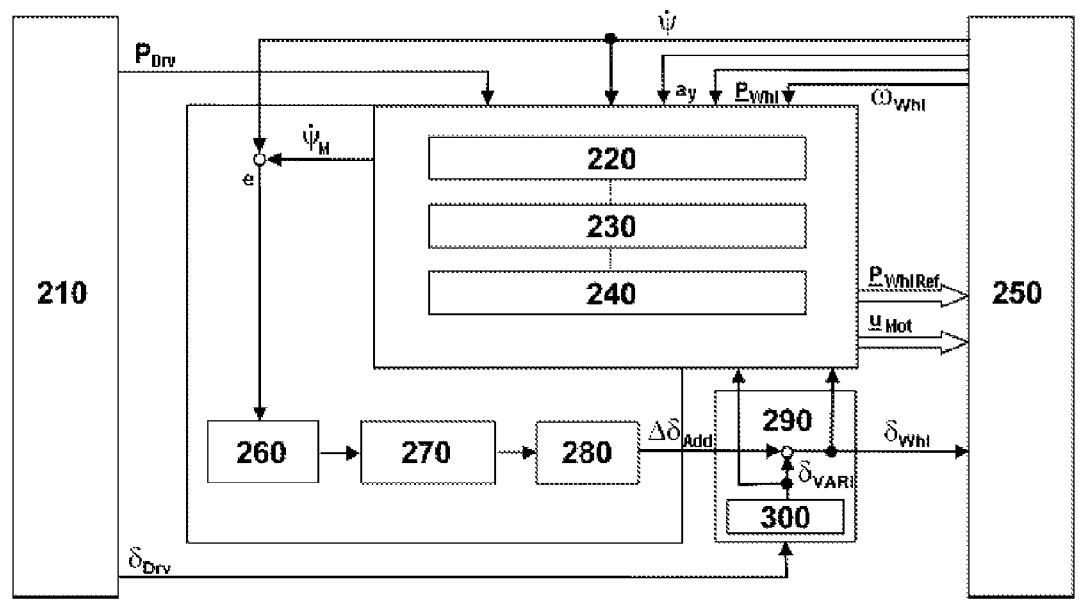
FIG. 2 shows a block diagram of an ESP system with integrated device according to the invention.

The block diagram of an ESP system with integrated device according to the invention, which system is shown in FIG. 2, in agreement with the ESP system according to the state of the art, which was described in the introduction, presents a unit 220 for calculating a target yaw rate $\dot{\psi}_M$, a yaw rate controller 230 for calculating a set value as a function of the result of a comparison of the difference between the acquired actual yaw rate $\dot{\psi}$ and the target yaw rate $\dot{\psi}_M$ with a threshold value, and a unit 240 for transmitting the setting signals $P_{WhlRef}$ and $u_{Mot}$ to the brake system and the motor management of the vehicle 250

The input variables for the system also include the brake pressure $P_{Drv}$, which is set by the driver 210, the steering angle $\delta_{Drv}$ which is set by the driver 210, the measured actual yaw rate $\dot{\psi}$ of the vehicle 250, the measured transverse acceleration $a_y$, the set $\dot{\psi}_{Whl}$ of the wheel velocities, and the set $P_{Whl}$ of the wheel-specific brake pressures of the vehicle 250.

The known device is completed here according to the invention by the control unit 260, the logic units 270 and 280, as well as a superposition steering 290. The output variables of the device which has been expanded in accordance with the invention are the set $P_{WhlRef}$ of the wheel-specific brake pressures, the motor moment $u_{Mot}$, and, in addition, a steering angle $\delta_{Whl}$, which is to be set on the steerable wheels of the vehicle 250, and in front of the steering gear of the steering of the vehicle 250.

As a result of the superposition steering 290, an additional steering motion on the basis of an additional steering angle ($\Delta\delta_{add}$) is superposed over the steering motion which has been initiated by the driver 210 of the vehicle 250.

The steering angle $\delta_{Whl}$, which occurs in front of the steering gear of the vehicle 250, for example, on a steering pinion of a toothed rod steering, is obtained from the sum of the steering angle $\delta_{Drv}$ which is set by the driver, and the additional steering angle ($\Delta\delta_{Add}$), and it is transferred by the steering gear to the steerable wheels of the vehicle 250. In the process, the steering gear provides a steering translation i, so that the result is a steering angle of $\delta_{Whl}/i$ at the steerable wheels of the vehicle 250.

The superposition steering 290 has an electromechanical actuator, which intervenes, via a drive, in the steering line of a conventional hydraulic or electric power steering. The drive can be, for example, a planet gear, where the steering pinion can be rotated by the insertion of the actuator opposite the steering wheel.

However, additional steering movements can also be generated in a so-called steer-by-wire steering system, in which a mechanical connection between the steering wheel and steering gear is replaced by electromechanical connections. Such a steering system is also appropriate for use in the context of the invention.

In addition, the superposition steering 290 can be equipped with a function of a freely selectable steering translation i between the driver instruction $\delta_{Drv}$ and the wheel strike angle.

This function can be carried out by the unit 300, for example, to achieve a velocity-dependent steering translation i, where, in the lower velocity range, a very immediate translation i is set, to facilitate the maneuvering for the driver, and in the upper velocity range, a very indirect translation is chosen, to ensure a problem-free straight movement of the vehicle 250.

For this purpose, the unit 300 calculates the steering angle $\delta_{VARI} = \ddot{u}_{VARI} \cdot \delta_{Drv}$ based on a velocity-dependent factor $\ddot{u}_{VARI}$, and it transmits said steering angle to the actuator of the superposition steering 290, which sets a steering angle $\delta_{Whl}$ on the steering gear, which steering angle corresponds to the sum of the steering angle $\delta_{VARI}$ and the additional steering angle $\Delta\delta_{Add}$.

It is preferred for the invention to be applied to vehicle 250 with four wheels on two axles. Steering interventions can here be carried out both on the front axle as well as on the rear axle, or simultaneously on both axles of the vehicle 250.

Autonomous steering interventions to improve the agility of a vehicle 250 are appropriate to increase the driving safety and the driving enjoyment for the driver 210 and they improve the vehicle's reaction behavior, which is delayed particularly in the case of steering instructions with large steering angle gradients $\dot{\delta}_{Drv}$ because of the elasticity of undercarriage elements, such as, the tires and the rubber bearings, as well as the vehicle's inertia due to the inertial moments, and the high and longitudinal axis, respectively.

Figure 3A:
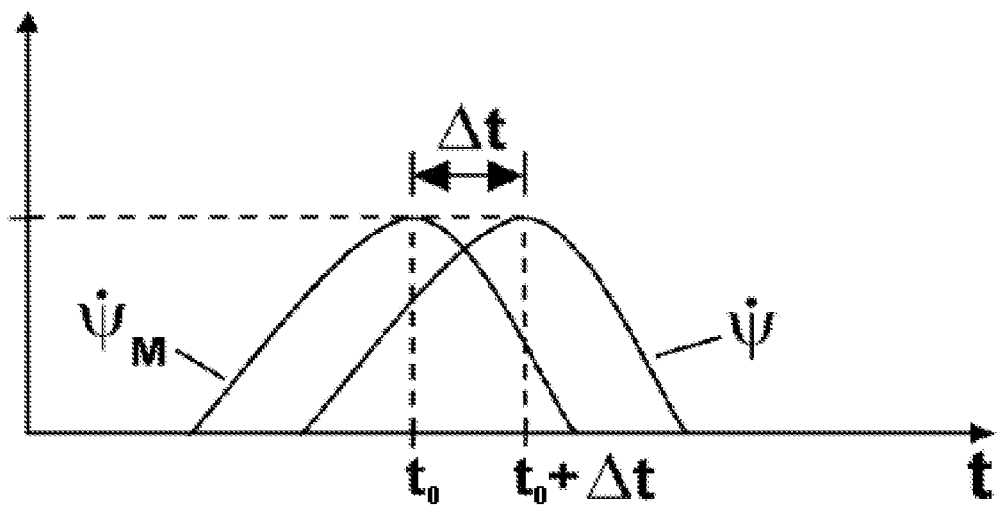
FIG. 3a shows a diagram with the temporal variation of the reference yaw rate and the actual yaw rate.

A target or desired vehicle yaw rate $\dot{\psi}_M$, which corresponds to the steering angle $\delta_{Drv}$ which is set by the driver 210, is compared to the delayed vehicle actual yaw rate $\dot{\psi}$, in the diagram of FIG. 3a.

With reference to the figure, it becomes clear that there is a phase delay $\Delta t$ in the vehicle's reaction. With regard to the agility, the driver 210 of the vehicle 250 perceives this delay as an indirect reaction behavior and thus as a loss of driving pleasure.

Figure 3B:
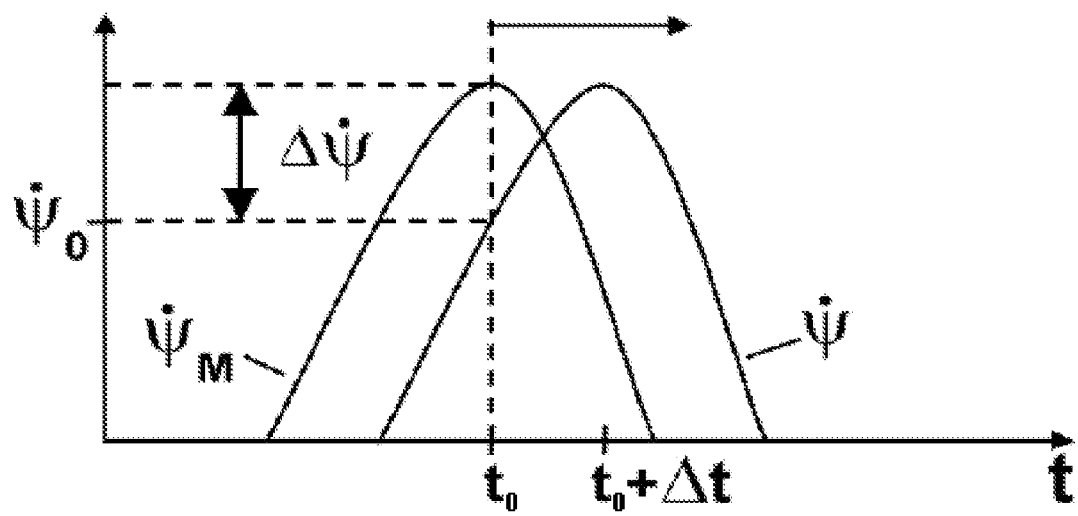
FIG. 3b shows an additional diagram with a temporal variation of the reference yaw rate and of the actual yaw rate.

The phase delay $\Delta t$ in the vehicle's reaction, however, can also lead to situations that are critical for the safety. For example, if a driver 210 must rapidly avoid an obstacle, he tends, as a rule, to "oversteer" due to the delayed vehicle reaction behavior, to set the desired value $\dot{\psi}_0$ for the yaw rate $\dot{\psi}$ on the vehicle 250 at a certain time $t_0$. If the total vehicle reaction, which results from the driver's instruction, occurs then at time $t_0+\Delta t$, it is much more violent than expected by the driver, so that he/she often loses control of the vehicle. In the diagram of FIG. 3b, the yaw rate increase $\Delta\dot{\psi}$ is shown, which results from "oversteering."

In the above described device to improve the vehicle's reaction behavior, the target yaw rate $\dot{\psi}_M$, which is calculated in the ESP steering apparatus 220 in the vehicle reference model, and which should be applied to the vehicle 250 based on the steering angle $\delta_{Drv}$, which is set by the driver 210, is used for the calculation of the additional steering angle $\Delta\delta_{Add}$.

The vehicle's target behavior is established by the vehicle manufacturer in accordance with his/her philosophy and it is deposited in the unit 220 in the form of software parameters.

In carrying out the control of the driving dynamics, the actual vehicle reaction behavior during the driving is monitored continuously by a yaw rate sensor, which determines the current vehicle actual yaw rate $\dot{\psi}$.

As a function of the control deviation e between the target reaction and the actual reaction, an additional steering angle $\Delta\delta^{Add}$ is calculated. By means of the superposition steering 290, an additional steering movement on the basis of the additional steering angle $\Delta\delta_{Add}$ is then superposed over the steering motion, which is initiated by the driver 210 of the vehicle 250, so that, in front of the steering gear of the vehicle, a steering angle $\delta_{Whl}$ is produced, which corresponds to the sum of the steering angle $\delta_{Drv}$, which is set by the driver 210, and the additional steering angle $\Delta\delta_{Add}$.

If a variable, for example, velocity-dependent, steering translation is integrated in the system network, the angle that is added is not the steering $\delta_{Drv}$, which is set by the driver 210, rather the value $\delta_{VARI}$ which has been multiplied with the translation factor $\ddot{u}_{VARI}$ is added to the additional steering angle $\Delta\delta_{Add}$.

Figure 4:
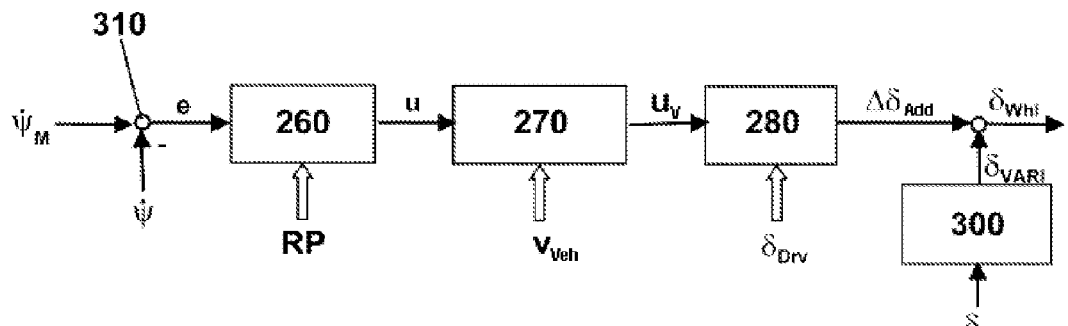
FIG. 4 shows a block diagram of the device according to the invention.

For the determination of the additional steering angle $\Delta\delta_{Add}$, three blocks 260, 270 and 280 are provided, which are represented again in FIG. 4 and described in greater detail below.

The input variable of the unit 260 ("Adaptive Controller") represents the control deviation e between the reference yaw rate $\dot{\psi}_M$ of [sic; and] the measured vehicle actual yaw rate $\dot{\psi}$, which is calculated as the difference between these two values by a subtractor 310. The unit 260 contains a controller for the calculation of a set value u, which is preferably a proportional controller with a differential component (PD controller).

The latter calculates the set value u according to the time function, $$U = K \cdot e + T_d \cdot \dot{e}$$

where $\dot{e}$ represents the derivative with respect to time of the deviation e.

The controller parameters K and $T_d$ are not preset here, rather they can be adapted by an adaptation mechanism to the actual driving condition. For example, different controller parameter sets RP are used in the noncritical and the critical driving ranges. It is also possible to apply an adaptation to the loading state of the vehicle 250.

The next block 270 ("Consideration of vehicle velocity") adapts the setting signal u, which is calculated by the block 260, to the current vehicle velocity $v_{Veh}$ whose value is determined from the measurement signals of the wheel rpm sensors.

It was observed that driving-dynamic interventions on the steering have nearly no effect at very low velocities, and that they have to be reduced at high velocities, to avoid causing instability of the vehicle.

Figure 5:
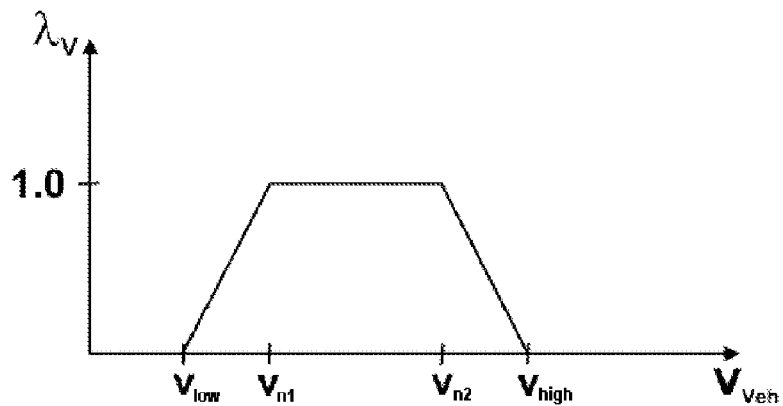
FIG. 5 shows the membership function of the set of "mean" vehicle velocities.

Therefore, in the first step, the membership degree $\lambda_v$ of the current value of the vehicle's velocity $V_{Veh}$ in a set of "mean" velocities is determined. The membership function $\lambda_V$, whose function values give the membership $\lambda_V$, is represented in the diagram of FIG. 5.

The membership function $\lambda_V$ is trapezoidal here: if the value of the vehicle's velocity $v_{Veh}$ is below the value $v_{low}$ or above the value $V_{high}$, a membership degree of $\lambda_v=0$ is obtained. The parameters $v_{low}$ and $v_{high}$ assume, for example, values of 30 km/h and 200 km/h. Full membership with membership degree $\lambda_v=1$ in the set of the "mean" velocities, on the other hand, exists if the vehicle's velocity $v_{Veh}$ assumes values between $v_{n1}$ and $v_{n2}$.

The above-mentioned observation with regard to the effectiveness of the steering interventions leads to the fuzzy rule "IF the vehicle's velocity $v_{Veh}$ is "low" or "large," THEN the set value u assumes the values u=0."

The conclusion of the rule is achieved in a simple manner in a second step by the fact that the setting signal u is multiplied with the membership degree $\lambda_V$, which is determined in the first step. The output variable of the unit 270 is thus the signal $u_v$ with $$u_v = \lambda_v \cdot u$$

Figure 6:
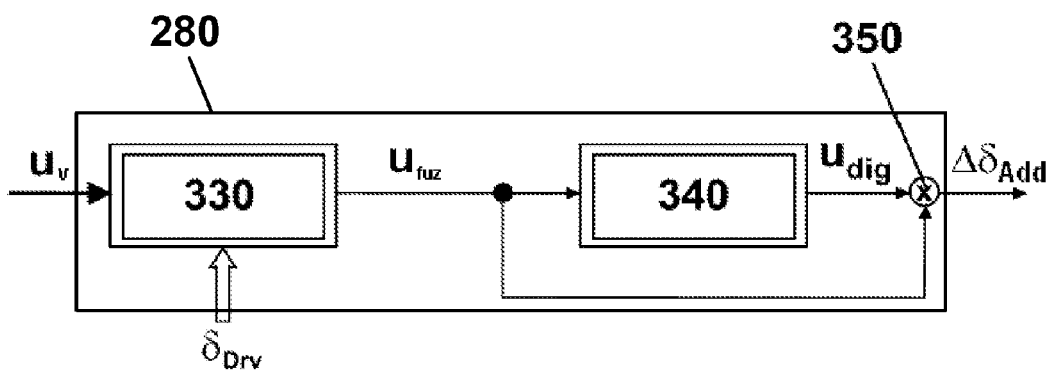
FIG. 6 shows a block diagram of a logic unit.

The signal $u_v$ is then processed by the unit 280 ("Activation Logic"), which is composed of two nonlinear blocks 330 and 340, and which is illustrated in the block diagram in FIG. 6.

The block 330 weights its input signal $u_v$ in accordance with the steering activities of the driver 210 and it generates the continuous intermediate value $u_{fuz}$. Based on a nonlinear hysteresis function in block 340, a digital signal $u_{dig}$, which can assume only the values zero and one, is then calculated and it is linked with the signal $u_{fuz}$, to determine the additional steering angle $\Delta\delta_{Add}$.

In the context of extensive driving tests it has been found that steering interventions with large additional steering angles $\Delta\delta_{Add}$ are not tolerated by the driver 210, if he himself does not intervene or intervenes only slightly via the steering wheel in the steering event. On the other hand, full driving-dynamic supports on the part of the dynamic controller must be provided in a driving situation where the driver 210 exerts a considerable steering effort. In order to design the external steering interventions of the control system so that they are comfortable with a view to the driver 210, the driving instructions of the driver 210 are therefore taken into consideration in the generation of the additional driving angle $\Delta\delta_{Add}$.

The driving effort is here characterized by the amount $|\delta_{Drv}|$ of the steering angle $\delta_{drv}$, which is set by the driver 210, and the amount $|\dot{\delta}_{Drv}|$, of the steering angle gradients $\dot{\delta}_{Drv}$, which is set by the driver 210.

Similarly to the procedure used for the adaptation of the set value u to the vehicle's velocity $v_{Veh}$, the intermediate value $u_{fuz}$ is also calculated by the block 330 based on the fuzzy rule. Here the fuzzy rule is:

"IF the amount $|\delta_{Drv}|$ of the steering angle $\delta_{Drv}$ is "small," AND the amount $|\dot{\delta}_{Drv}|$ of the steering angle gradient $\dot{\delta}_{Drv}$ is "small," THEN the value $u_{fuz}$ is also "small"."

This rule is a short and pithy formulation of the above described requirements for the determination of the amount of the addition steering angle $\delta\Delta_{Add}$. The linguistic value "small" for the amounts $|\delta_{Drv}|$ and $|\dot{\delta}_{Drv}|$ is here described again by a fuzzy set.

Figure 7A:
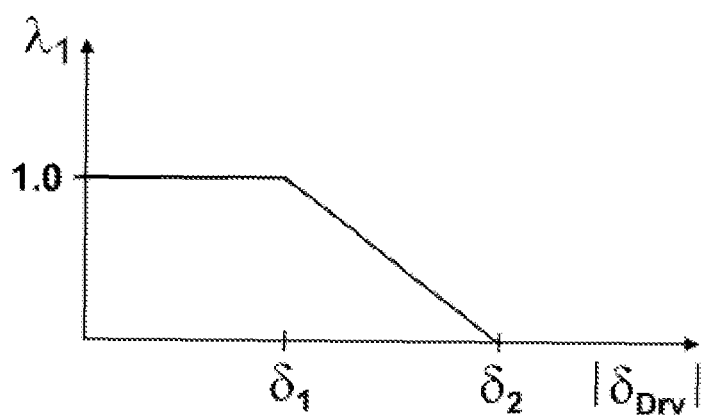
FIG. 7a shows a diagram with the membership function of the set of "small" steering angles.
Figure 7B:
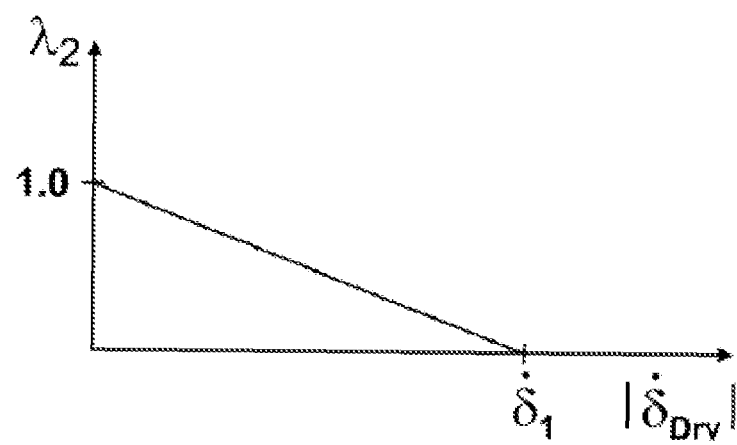
FIG. 7b shows a diagram with the membership function of the set of the "small" steering angle gradients.

The membership function $\lambda_1$ of the set of the "small" amounts $|\delta_{drv}|$ is represented in the diagram of FIG. 7a. The diagram of FIG. 7b shows the membership function $\lambda_2$ of the set of the "small" amounts $|\dot{\delta}_{Drv}|$.

The membership functions here have left-side boundaries: A membership degree $\lambda_1$ in the "small" amounts $|\delta_{Drv}|$ which is different from zero occurs only if the amount $|\delta_{Drv}|$ of the steering angle $\delta_{Drv}$, which is set by the driver 210, is smaller than a value $\delta_2$, and a membership degree of $\lambda_1=1$ occurs if the amount $|\delta_{Drv}|$ of the steering angle $\lambda_{Drv}$, which is set by the driver 210, is smaller than a value $\delta_1$. The parameters $\delta_1$ and $\delta_2$ assume values of 5° and 15°, for example.

The membership function $\lambda_2$ is indicated as a triangular membership function which has a left-side boundary. A membership degree $\lambda_2$ which is different from zero occurs only if the steering angle gradient $\dot{\delta}_{Drv}$, which is set by the driver 210, has an amount which is smaller than a value $\dot{\delta}_1$, and a membership degree of $\lambda_2=1$ occurs only for $\dot{\delta}_{Drv}=0$.

Once the membership degrees $\lambda_1$ and $\lambda_2$ have been determined by the block 330, the AND operation of the above-mentioned rule is reproduced in the next step. For this purpose, the membership degrees $\lambda_1$ and $\lambda_2$, as is conventionally done in fuzzy logic, are linked by a minimum operation. In the process, the value $\lambda$ is calculated by $$\lambda = \min\{\lambda_1, \lambda_2\}.$$

If the value of $\lambda$ is close to the value one, this means that the steering effort performed by the driver is small, and the conditions for a considerable weakening of the setting signal $u_v$ are satisfied. On the other hand, if the value of e moves around the value zero, the driver is exerting a considerable steering effort, and the additional steering angle $\Delta\delta_{Add}$ should be taken fully into account.

The value $u_{fuz}$ is thus calculated as follows:

$$u_{fuz} = u_v \cdot (1-\lambda)$$

Figure 8:
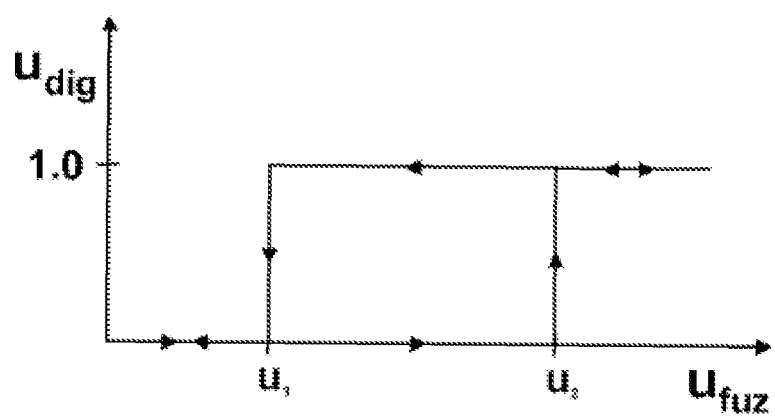
FIG. 8 shows a diagram with a hysteresis curve.

For the determination of the additional steering angle $\Delta\delta_{Add}$ to be set, the signal $u_{fuz}$ is finally processed by the block 340. The latter block determines the value $u_{dig}$ based on the hysteresis curve, shown in FIG. 8, from the signal $u_{fuz}$, and the additional steering angle $\Delta\delta_{Add}$ is then determined by multiplying the set value $u_{fuz}$ with a value $u_{dig}$. This multiplication is carried out by multiplier 350.

If the input signal $u_{fuz}$ of the block 340 exceeds a value $u_2$, the output signal $u_{dig}=1$ and it keeps this value until $u_{fuz}$ becomes smaller than a value $u_1$.

The signal $u_{dig}$ thus represents an additional request signal, a so-called request flag, by means of which an additional evaluation of the setting requests is carried out. Very small setting requests are suppressed particularly strongly here, if they result in a value of $u_{dig}=0$, and they lead to no actuator activity at all in the superposition steering 290.

This measure reduces the setting effort of the actuator and, in setting systems with haptic feedback on the steering wheel, it has the advantage that the steering feeling is considerably improved for the driver 210. Small additional steering interventions, which are essentially negligible for the dynamics of the vehicle 250, are completely suppressed and thus they are not perceived by the driver as interfering variations in the moment on the steering wheel.

The value $\Delta\delta_{Add}$, which is calculated by multiplying $u_{dig}$ and $u_{fuz}$, is then sent as a setting request to the actuator of the superposition steering 290. Thus, it represents the output variable of the described device.

The vehicle 210, while performing the task of steering the course in the less-than-critical driving range, is effectively supported by the external steering interventions which are calculated by the control system. The agility of the vehicle is increased, and excessive steering, for example, during avoidance maneuvers, is prevented.

As a result of the harmonic adaptation of the individual control components and the adaptation of the steering intervention to the vehicle's velocity $v_{Veh}$ and particularly to the activities of the driver 210, the generated additional steering intervention is not perceived by the driver 210 and does not affect him. Moreover, an increase in the steering reactivity due to the handling controller is prevented by an intelligent activation mechanism.

In critical driving situations, the steering interventions according to the invention can be combined with conventional brake and motor intervention of an ESP system, in order to be able to control the steering intervention better than by interventions on the brakes and motor alone.

As a result of the use of such steering interventions, the interventions become only necessary at a later time.

Thus, the invention provides an advantageous, yaw rate-based control system, by means of which, based on the driver's instruction and the vehicle reaction which is determined by sensors, additional steering angles $\Delta\delta_{Add}$ in the noncritical driving situation can be calculated, which perceptibly improve the vehicle reaction behavior for the driver 210. The advantages of the invention here include an increase in comfort, particularly an increase in agility, and also an increased safety for the vehicle 250.

The invention claimed is:

1. A method for controlling the driving dynamics of a vehicle (250), in which a steering movement is carried out on the basis of a set value (u), which is calculated as a function of a deviation between a desired value ($\dot{\psi}_M$) and an acquired actual value ($\dot{\psi}$) of a vehicle state variable ($\dot{\psi}$), comprising the steps of
   determining a membership degree ($\lambda_1, \lambda_2$) of at least one member of the group of acquired values consisting of a driver-set steering angle ($\delta_{Drv}$), and of a driver-set steering angle gradient ($\dot{\delta}_{Drv}$) with respect to a given fuzzy set, and changing a value ($\Delta\delta_{Add}$) of the set value (u) as a function of this membership degree ($\lambda_1, \lambda_2$) wherein the membership degree ($\lambda_1$) of the value ($\delta_{Drv}$) of the steering angle ($\delta_{Drv}$), which is set by the driver (210), with respect to a set of "small" steering angles is determined.

2. The method according to claim 1,
   wherein the membership degree ($\delta_2$) of the steering angle gradient ($\dot{\delta}_{Drv}$), which is set by the driver (210), with respect to a set of "small" steering angle gradients is determined.

3. The method according to claim 1,
   wherein the value ($\Delta\delta_{Add}$) of the set value (u) is additionally changed as a function of an acquired value of a vehicle velocity ($V_{Veh}$).

4. The method according to claim 3,
   wherein the value ($\Delta\delta_{Add}$) of the set value (u) is changed as a function of the membership degree ($\lambda_v$) of the acquired value ($V_{Veh}$) of the vehicle velocity ($V_{Veh}$) with respect to a set of "mean" velocities.

5. The method according to claim 3, comprising the step of suppressing a steering movement when the acquired value ($V_{Veh}$) of the vehicle velocity ($V_{Veh}$) is below a first limit value ($V_{low}$) or above a second limit value ($V_{high}$).

6. A device for controlling the driving dynamics of a vehicle (250), with a control unit (260), which, on the basis of the deviation of an acquired actual value ($\dot{\psi}$) of a vehicle state variable ($\dot{\psi}$) from a given desired value ($\dot{\psi}_M$), determines a setting value (u), on the basis of which a steering movement is carried out,
   wherein the device comprises a fuzzy logic unit (280) for determining the membership degree ($\lambda_1$) of a value ($\delta_{Drv}$) of a steering angle ($\delta_{Drv}$), which has been set by the driver (210), with respect to of "small" steering angles, and a membership degree ($\lambda_2$) of a steering angle gradient ($\dot{\delta}_{Drv}$), which has been set by the driver, in a set of "small" steering angle gradients and for changing a value ($\Delta\delta_{Add}$) of the set value (u) using a linkage of the membership degrees ($\lambda_1, \lambda_2$).

7. The device according to claim 6,
   comprising a logic unit (270) for determining a membership degree ($\lambda_v$) of an acquired value ($v_{Veh}$) of a vehicle velocity ($v_{Veh}$) with respect to of "mean" velocities and for changing the value ($\Delta\delta_{Add}$) of the setting value (u) as a function of this membership degree ($\lambda_v$).

* * * * *